(No Model.)  3 Sheets—Sheet 1.
T. R. CRANE.
GRAIN DRILL.
No. 363,605.  Patented May 24, 1887.
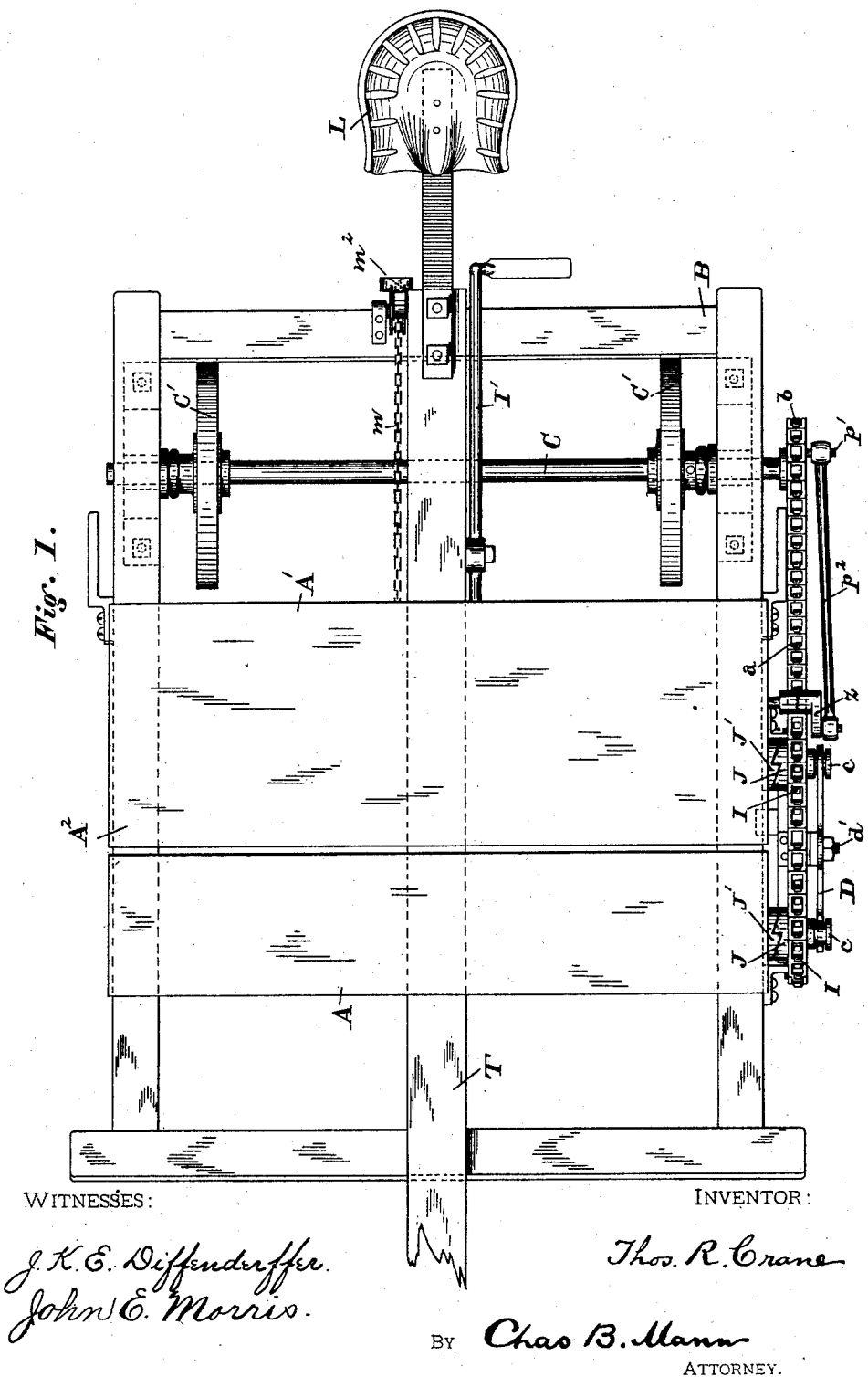
WITNESSES:
J. K. E. Diffenderffer.
John E. Morris.
INVENTOR:
Thos. R. Crane
BY Chas B. Mann
ATTORNEY.

(No Model.) 3 Sheets—Sheet 2.
T. R. CRANE.
GRAIN DRILL.
No. 363,605. Patented May 24, 1887.
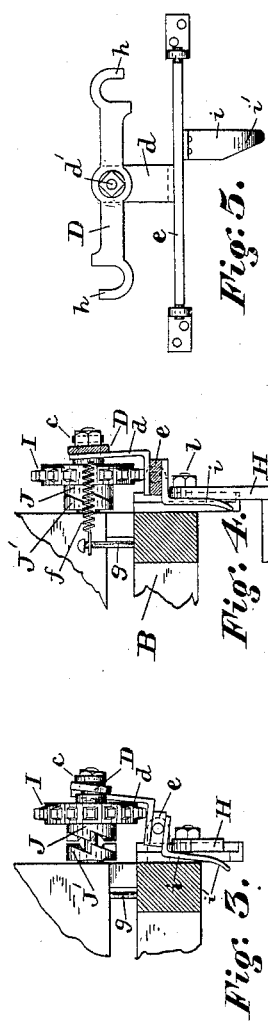
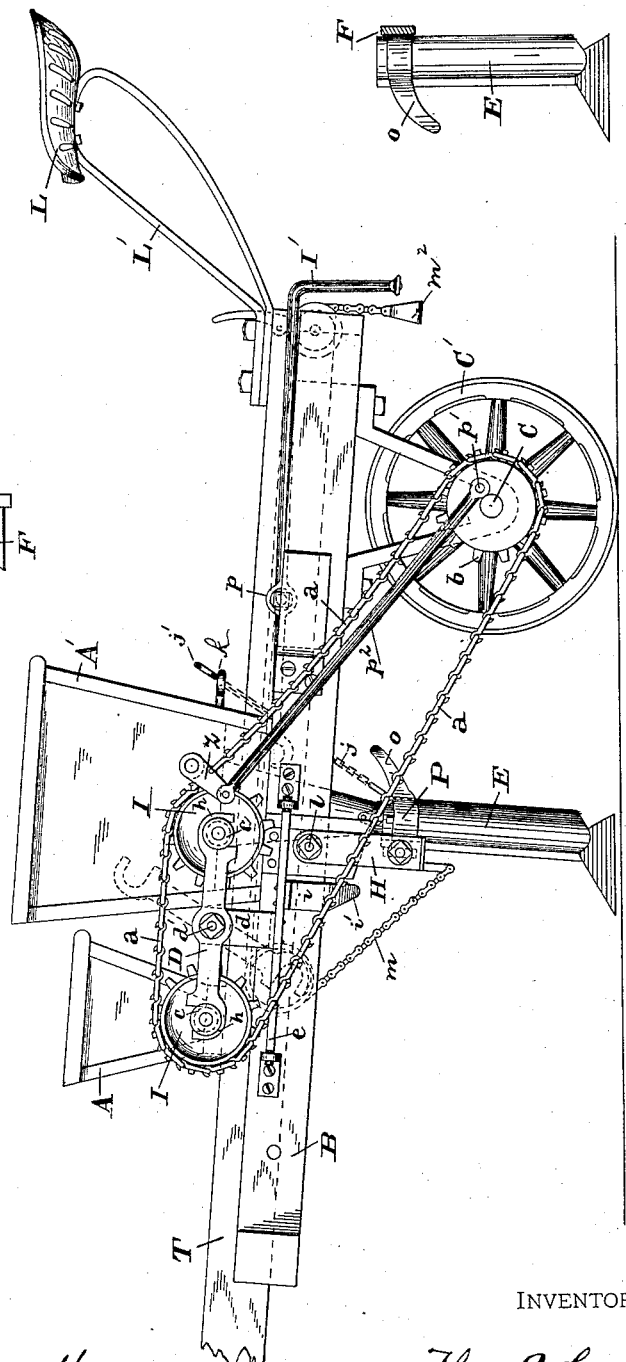
WITNESSES:
J. K. E. Diffenderffer.
John E. Morris.
INVENTOR:
Thos. R. Crane
BY Chas B. Mann
ATTORNEY.

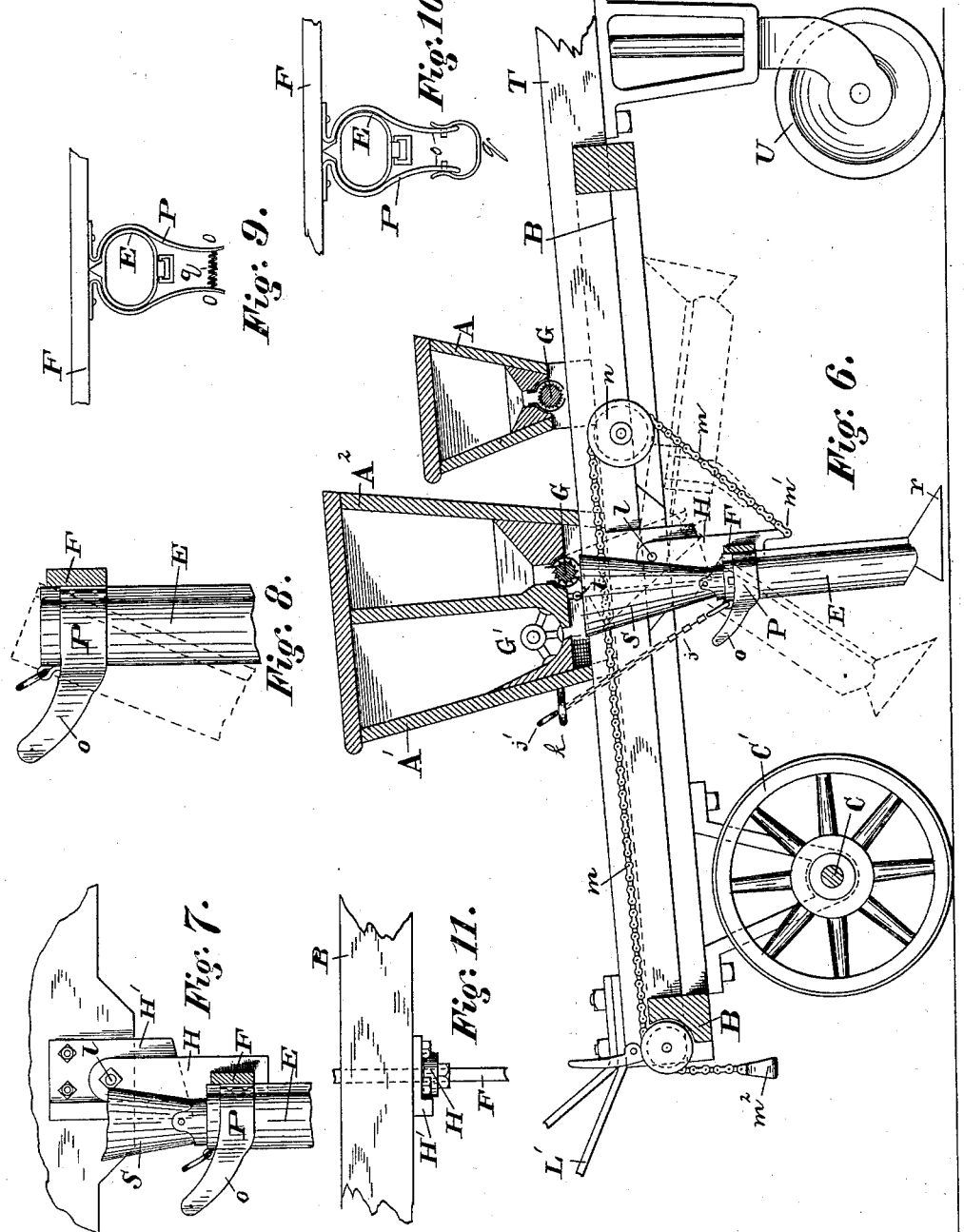

UNITED STATES PATENT OFFICE.

THOMAS R. CRANE, OF HEATHSVILLE, VIRGINIA.

GRAIN-DRILL.

SPECIFICATION forming part of Letters Patent No. 363,605, dated May 24, 1887.

Application filed March 3, 1887. Serial No. 229,543. (No model.)

*To all whom it may concern:*

Be it known that I, THOMAS R. CRANE, a citizen of the United States, residing at Heathsville, in the county of Northumberland and State of Virginia, have invented certain new and useful Improvements in Grain-Drills, of which the following is a specification.

This invention relates to an improved drill for sowing grain or seed, and is illustrated in the accompanying drawings, in which—

Figure 1 is a plan or top view of the machine. Fig. 2 is a side elevation of the machine. Figs. 3, 4, and 5 are detail views of the device by which the clutches are engaged and released, which operates the grain and fertilizer feeds. Fig. 6 is a vertical longitudinal section of the machine. Figs. 7 and 8 are detail views of the drill-tube parts, cross-bar, and hanger. Figs. 9 and 10 show top views of two constructions of a yielding clamp for attaching the drill-tubes to the cross-bar. Fig. 11 is a top view, a detail of the cross-bar hanger. Fig. 12 shows a modification in which the drill-tubes and clamp are in front of the horizontal cross-bar.

The letters A A' A² designate the hoppers for seed, grain, or fertilizer. One or all may be used. These are supported on a frame, B, which is mounted on an axle, C, having two wheels, C'; or, instead of the said wheels, a roller may be employed. Each hopper has a suitable feed device, not necessary to describe here fully. The feed device, however, employs a feed-shaft, G, which may be inserted or removed endwise, and each shaft has on one end, outside of the hopper, a sprocket-wheel, I, which turns loosely on the said shaft, and a simple clutch device, J J', readily understood by reference to the drawings, has one of its parts, J, on the said sprocket-wheel and the other part, J', fixed rigidly on the feed-shaft. By means of this clutch the feed-shafts may, by a chain, a, passed over the sprocket-wheels I, and also over a similar wheel, b, on the axle C, be driven when the movement of the machine is in the right direction, but will remain at rest when the machine is moved in the opposite direction. Furthermore, the movable part J of the clutch will be automatically released or disengaged from the other part, J', whenever the drill-tubes are raised or lowered, as hereinafter described.

Both sprocket-wheels I have a collar or flanged hub, c, on the outer side. A clutch-bar, D, has each of its ends attached to one of said collars c, and said clutch-bar is supported on an upright arm, d, of a rock-shaft, e. When the shaft e is rocked so as to throw the upright arm d outward or away from the frame, the result will be to move the clutch-bar D in the same direction, and thereby slide the two sprocket-wheels I and release the clutches, as shown in Fig. 3. The clutch-bar D is drawn in the opposite direction by a spiral spring, f, which has one end attached to the clutch-bar and the other end to a stud or post, g, on the frame, (see Figs. 3 and 4,) and normally draws the clutch-bar; but said spring f yields whenever the clutch-bar is forced outward by the rock-shaft e.

The feed-shafts G may have to be removed from the hoppers to admit others of greater or less feed capacity, thereby to suit the particular grain or seed that it may be desired to sow. To facilitate this the clutch-bar D is centrally pivoted at d' on the upright arm d, so as to turn in a vertical plane, and each end of said bar has a hook, h, by which attachment is made with the sprocket-collar c. One of the hooks points up and the other down. It will thus be seen that by turning the clutch-bar D on its pivot d' the sprockets I may be removed and the feed-shaft G drawn out.

The rock-shaft e has a depending or down-pointing arm, i, which, near the lower end, is curved or inclined at i'. Motion is imparted to the rock-shaft by means of this depending arm, as hereinafter described.

Each drill-tube E is raised and lowered vertically by a chain, j, having at its upper end a ring, j', which, when the tube is down, rests on a suitable support, k, back of the hopper. A bar, F, extends horizontally crosswise below the frame, and at each end is supported by a hanger-arm, H, pivoted at l to the frame. This cross-bar F renders the usual drag-bars heretofore employed unnecessary. All the drill-tubes are attached to this bar, and both the bar and drill-tubes may be raised by the hanger-arms H swinging up toward the front of the machine, as indicated by broken lines in Fig. 6. As here shown, this position of the drill-tubes is the proper one when the machine is moving along the road, or when in the field it is desired to pass a serious obstruction, such as a stump or a large stone. It is obvious that the cross-bar F and drill-tubes attached to it may, by similar contrivances, be swung up rearward instead of toward the front. The means for swinging up toward the front the hanger-arms H, bar F, and drill-tubes E comprise the chain $m$, one end of which is attached at $m'$ to the bar and passes over pulleys $n$, and has at the other end, near the seat L, a stirrup, $m^2$. By the driver placing his foot in the stirrup $m^2$ and bearing down thereon, the drill-tubes will be swung up toward the front.

Each drill-tube E is attached to the crosswise bar F by a yielding clamp, P, which admits the tube to move back from the bar to a limited extent. This clamp comprises two spring-jaws, P, attached to the rear of the bar F. Near the said bar the two jaws swell out, and thus afford room between them for the drill-tube E. Each spring-jaw has a rear-extended arm, $o$, and the extremities of the two arms are united by a spring, $q$. This yielding clamp, as an attaching device for the drill-tube, will hold the tube close to the bar F while drilling under ordinary conditions; but in case the point $r$ of the drill-opener strikes an obstacle fixed in the ground—such as a root or stone—the clamp P will allow the tube to move back to a limited extent and pass over said obstacle without fully releasing it, as indicated by broken lines in Fig. 6.

The grain and fertilizer are conveyed from the hoppers to the drill-tubes by continuous jointed metal tubes S. These jointed tubes are a substitute for the ordinary rubber tubes heretofore used, and are a much superior device. The rubber tubes from usage kink or bend short, and therefore become worthless, as the kinks hinder the downflow of the grain or fertilizer, and also induce decay in the rubber and cotton of which the tubes are composed. The jointed metal tubes S obviate all of this difficulty. The upper section of the jointed tube is suitably hinged at $t$ below the hopper-bottom. The lower section of the jointed tube extends down into the drill-tube E, and is as free to move forward or back as though the flexible rubber tube were employed.

Each of the side pivoted hanger-arms, H, is prevented from swinging backward by a stop-arm, H', which stays said hanger-arm when it is in a vertical position and leaves it free to swing up toward the front.

The fertilizer-box A' has an agitator, G', of well-known construction, shown in my Letters Patent No. 319,393, dated June 2, 1885. The shaft of this agitator has an arm, $z$, and a rod, $p^2$, connects the arm with a crank-wheel wrist, $p'$, on the axle of the sprocket-wheel $b$. As the said agitator-arm is longer than the crank-wrist $p'$ is from its axis, the rotation of the latter will cause the former to vibrate.

The front of the frame B is supported by a caster-wheel, U, and the seat L at the rear by brace-bars L'. The letter T designates the draft-pole. The treadle-rod I' is employed in connection with a harrow which is designed to be used with the frame of this machine interchangeably with some other parts. The harrow is not here shown, but is illustrated and described in another application pending herewith.

It is obvious that the clutch-actuating bar, rock-shaft $e$, and down-pointing arm $i$ may operate the clutch device of a single shaft as well as two shafts.

From the foregoing description the operation of the machine will be readily understood by any one familiar with the working of machines of this class.

Having described my invention, I claim and desire to secure by Letters Patent of the United States—

1. In a drill, the combination of the two feed-shafts G, each provided on its end with a drive-wheel, I, a clutch, J J', connecting each drive-wheel with its shaft, a clutch-actuating bar, D, having its opposite ends attached to different ones of said drive-wheels I, and a rock-shaft, $e$, mounted in bearings and supporting the said clutch-actuating bar, for the purpose set forth.

2. In a drill, the combination of the two feed-shafts G, each provided on its end with a drive-wheel, I, a clutch, J J', connecting each drive-wheel with its shaft, a clutch-actuating bar, D, having its opposite ends attached to different ones of said drive-wheels I, a rock-shaft, $e$, mounted in bearings and supporting the said clutch-actuating bar, a spring, $f$, drawing the clutch-actuating bar and keeping the said drive-wheels engaged with their respective shafts, a down-pointing arm, $i$, attached to the rock-shaft, and a pivoted hanger-arm, H, to act on said down-pointing arm, for the purpose set forth.

3. In a drill, the combination of hanger-arms H, pivoted to the machine-frame, a bar, F, supported by said hanger-arms and extending horizontally crosswise of the machine, and drill-tubes E, attached to said horizontal bar.

4. In a drill, the combination of hanger-arms H, pivoted to the machine-frame, a bar supported by said hanger-arms and extending horizontally crosswise of the machine, drill-tubes attached to the horizontal bar, and means for swinging up the hanger-arms, horizontal bar, and drill-tubes, as set forth.

5. In a drill, the combination of hanger-arms H, pivoted to the machine-frame, a swing-bar, F, supported by said hanger-arms and extending horizontally crosswise of the machine, drill-tubes, and a yielding clamp attaching each drill-tube to the horizontal swing-bar.

6. The combination of an attaching-bar, F, and a drill-tube clamp comprising two spring-jaws, P, each having an outward swell near the said attaching-bar, which affords room to receive the drill-tube, each jaw provided with an arm, $o$, extending away from the attaching-bar, and the extremities of the said two arms being united by a spring, $q$, whereby a drill-tube which normally occupies the outward swells may move therefrom back between the extended arms, but will not be wholly released.

7. In a drill, the combination of hanger-arms H, pivoted to the machine-frame, a stop-arm to stay each hanger-arm when in a vertical position and prevent it from swinging back, a horizontal bar, F, supported by said hanger-arms, drill-tubes attached to said horizontal bar, whereby the drill-tubes and horizontal bar may be swung up toward the front of the machine.

8. In a drill, the combination of a feed-shaft, G, provided on its end with a drive-wheel, I, a clutch, J J', connecting the drive-wheel with its shaft, a clutch-actuating bar attached to a rock-shaft, $e$, having a down-pointing arm, $i$, and a pivoted hanger-arm, H, to act on said down-pointing arm, for the purpose set forth.

In testimony whereof I affix my signature in presence of two witnesses.

THOMAS R. CRANE.

Witnesses:
JOHN E. MORRIS,
JNO. T. MADDOX.